US011064008B2

(12) United States Patent
Scoda

(10) Patent No.: US 11,064,008 B2
(45) Date of Patent: Jul. 13, 2021

(54) METHODS FOR FACILITATING A REMOTE INTERFACE AND DEVICES THEREOF

(71) Applicant: Usablenet Inc., New York, NY (US)

(72) Inventor: Enrico Scoda, Martignacco (IT)

(73) Assignee: USABLENET INC., New York, NY (US)

( * ) Notice: Subject to any disclaimer, the term of this patent is extended or adjusted under 35 U.S.C. 154(b) by 471 days.

(21) Appl. No.: 14/677,042

(22) Filed: Apr. 2, 2015

(65) Prior Publication Data

US 2015/0319215 A1  Nov. 5, 2015

Related U.S. Application Data

(60) Provisional application No. 61/988,639, filed on May 5, 2014.

(51) Int. Cl.
*G06F 3/0484* (2013.01)
*G06F 3/0485* (2013.01)
*G06F 3/0488* (2013.01)
*G06F 9/451* (2018.01)
(Continued)

(52) U.S. Cl.
CPC .......... *H04L 67/025* (2013.01); *G06F 3/0485* (2013.01); *G06F 3/04842* (2013.01); *G06F 3/04847* (2013.01); *G06F 3/04883* (2013.01); *G06F 9/452* (2018.02); *H04L 67/10* (2013.01);
(Continued)

(58) Field of Classification Search
CPC ....... H04L 67/025; H04L 67/38; H04L 67/34; H04L 67/10; G06F 9/4445; G06F 3/0485; G06F 3/04883; G06F 3/04842; G06F 3/04847
See application file for complete search history.

(56) References Cited

U.S. PATENT DOCUMENTS 7,046,134 B2 * 5/2006 Hansen ................. G06F 3/1454
340/506
8,887,052 B1 * 11/2014 Young ................. H04L 12/1822
715/732
(Continued)

OTHER PUBLICATIONS

I. Fette et al., The WebSocket Protocol, Internet Engineering Task Force. RFC 6455; 2011-12; ISSN: 2070-1721 (Year: 2011).*
(Continued)

*Primary Examiner* — Justin R. Blaufeld
(74) *Attorney, Agent, or Firm* — Troutman Pepper Hamilton Sanders LLP (Rochester)

(57) ABSTRACT

A method, non-transitory computer readable medium, remote interface server computing device, and system that provides a presentation web page to a presentation device and a remote web page to a remote device. The remote web page is configured to, when executed by the remote device, register the remote device as associated with the presentation device and render a swipe panel on a display of the remote device. A first message is received from the remote device in response to an interaction with the swipe panel. A second message is sent to the presentation device in response to receiving the first message. The second message, when executed by the presentation device, is configured to cause the presentation device to perform an action on the presentation web page corresponding to the user interaction with the swipe panel.

20 Claims, 10 Drawing Sheets

(51) Int. Cl.
*H04L 29/08* (2006.01)
*H04L 29/06* (2006.01)

(52) U.S. Cl.
CPC ........ *H04L 67/34* (2013.01); *H04L 29/06034* (2013.01); *H04L 67/38* (2013.01)

(56) References Cited

U.S. PATENT DOCUMENTS

| | | | | |
|---|---|---|---|---|
| 9,024,894 | B1* | 5/2015 | Smith | H04N 21/422 |
| | | | | 345/173 |
| 9,406,157 | B2* | 8/2016 | Liu | G09G 5/14 |
| 9,639,623 | B2* | 5/2017 | Lund | H04L 67/10 |
| 2002/0162121 | A1* | 10/2002 | Mitchell | H04N 21/4622 |
| | | | | 725/135 |
| 2009/0153288 | A1* | 6/2009 | Hope | G06F 3/0485 |
| | | | | 340/3.1 |
| 2009/0156251 | A1* | 6/2009 | Cannistraro | G08C 17/02 |
| | | | | 455/557 |
| 2011/0072355 | A1 | 3/2011 | Carter et al. | |
| 2012/0054616 | A1 | 3/2012 | Mittal | |
| 2012/0117145 | A1* | 5/2012 | Clift | G06T 15/005 |
| | | | | 709/203 |
| 2012/0185532 | A1* | 7/2012 | Kristiansson | H04L 67/125 |
| | | | | 709/203 |
| 2012/0188147 | A1* | 7/2012 | Hosein | H04N 21/4222 |
| | | | | 345/2.2 |
| 2013/0097239 | A1* | 4/2013 | Brown | H04L 67/02 |
| | | | | 709/204 |
| 2013/0169526 | A1* | 7/2013 | Gai | G06F 3/04883 |
| | | | | 345/156 |
| 2013/0212484 | A1 | 8/2013 | Joshi et al. | |
| 2013/0239132 | A1 | 9/2013 | Rakoff et al. | |
| 2013/0326364 | A1* | 12/2013 | Latta | G02B 27/017 |
| | | | | 715/751 |
| 2013/0339850 | A1 | 12/2013 | Hardi et al. | |
| 2014/0006915 | A1* | 1/2014 | Bank | G06F 16/954 |
| | | | | 715/205 |
| 2014/0006949 | A1 | 1/2014 | Briand et al. | |
| 2014/0040767 | A1* | 2/2014 | Bolia | G06F 3/1454 |
| | | | | 715/751 |
| 2014/0149592 | A1* | 5/2014 | Krishna | H04L 67/16 |
| | | | | 709/226 |
| 2014/0149916 | A1* | 5/2014 | Manoff | G06F 3/0488 |
| | | | | 715/781 |
| 2014/0181631 | A1* | 6/2014 | Lund | H04L 67/10 |
| | | | | 715/234 |
| 2014/0215356 | A1* | 7/2014 | Brander | G06F 3/14 |
| | | | | 715/753 |
| 2014/0333509 | A1* | 11/2014 | Yuann | G09G 5/003 |
| | | | | 345/2.1 |
| 2015/0278534 | A1* | 10/2015 | Thiyagarajan | G06F 21/84 |
| | | | | 726/28 |
| 2016/0103494 | A1* | 4/2016 | Zehler | H04L 41/0803 |
| | | | | 358/1.15 |

OTHER PUBLICATIONS

Furukawa, Y. "Web-based control application using WebSocket." ICALEPCS2011 (2011): 673-675.*
International Preliminary Report on Patentability for corresponding Application No. PCT/US2015/024172, dated Nov. 17, 2016, pp. 1-7.
Extended European Search Report and Written Opinion for Corresponding European Patent Application 15789708.3, 7 pages, dated Nov. 13, 2017.

* cited by examiner

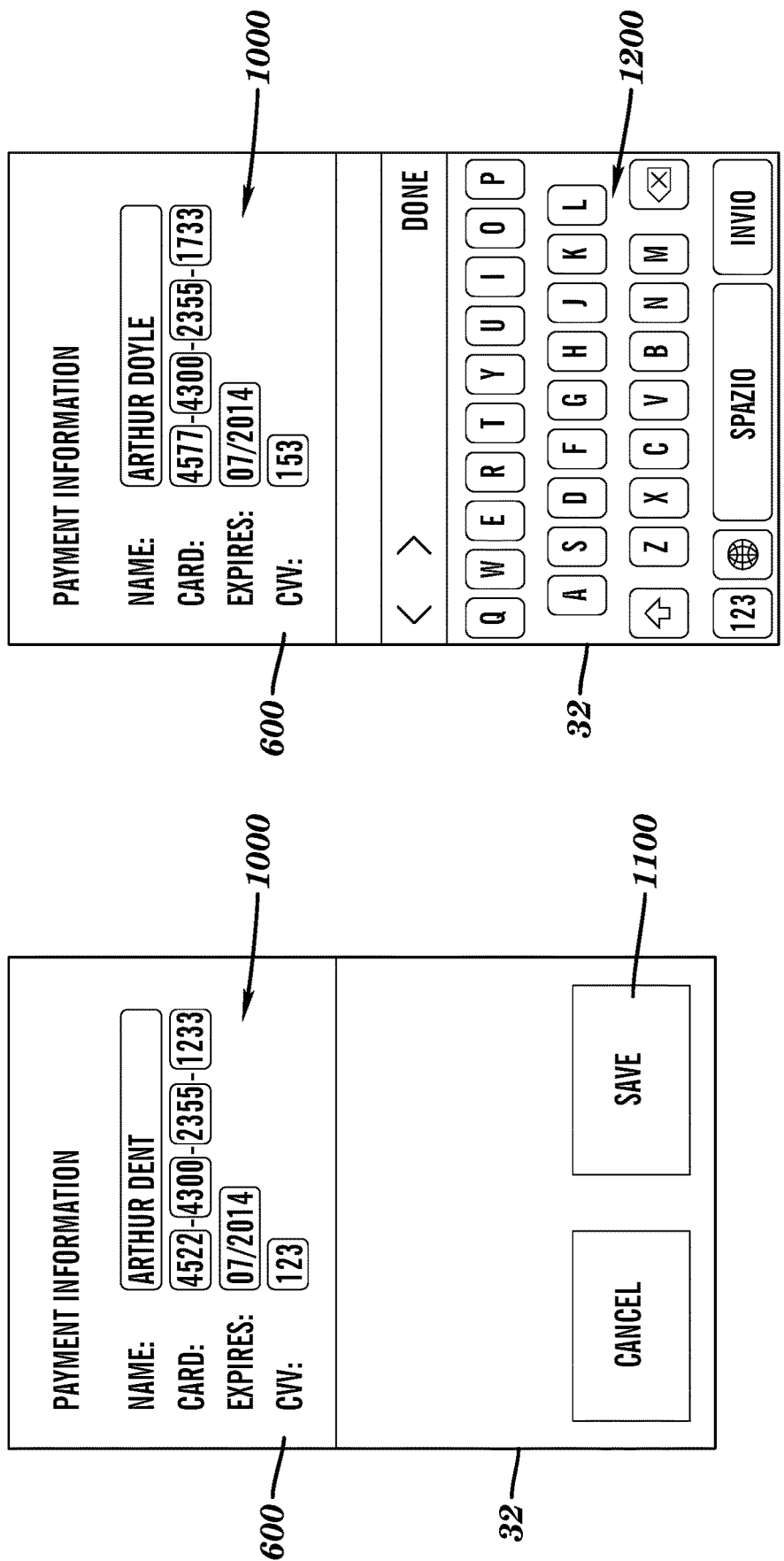

METHODS FOR FACILITATING A REMOTE INTERFACE AND DEVICES THEREOF

This application claims the benefit of U.S. Provisional Patent Application Ser. No. 61/988,639 filed on May 5, 2014, which is hereby incorporated by reference in its entirety.

FIELD

This technology generally relates to kiosk and other presentation devices, and more particularly to methods and devices for facilitating a remote interface for interacting with such presentation devices.

BACKGROUND

Presentation devices, such as kiosks and other devices with relatively large screen sizes, are often available for interaction in commercial and other settings. Presentation devices can display product information associated with a catalog of available products for a retailer, for example, advertising information, or any other information directed to consumers or other members of the public.

The method of interaction with presentation devices is often through a multi-touch screen. However, such presentation devices are generally complex and have relatively high associated cost due to the multi-touch screens and required processing power. Additionally, presentation devices with relatively large screen sizes are currently unable to effectively present, and/or allow users to input, private information (e.g. personally identifiable information or credit card numbers) in a discreet manner.

SUMMARY

A method for facilitating a remote interface includes providing, by a remote interface server computing device, a presentation web page to a presentation device and a remote web page to a remote device. The remote web page is configured to, when executed by the remote device, register the remote device as associated with the presentation device and render a swipe panel on a display of the remote device. A first message is received, by the remote interface server computing device, from the remote device in response to an interaction with the swipe panel. A second message is sent, by the remote interface server computing device, to the presentation device in response to receiving the first message. The second message, when executed by the presentation device, is configured to cause the presentation device to perform an action on the presentation web page corresponding to the user interaction with the swipe panel.

A non-transitory computer readable medium having stored thereon instructions for facilitating a remote interface comprising executable code which when executed by a processor, causes the processor to perform steps including providing a presentation web page to a presentation device and a remote web page to a remote device. The remote web page is configured to, when executed by the remote device, register the remote device as associated with the presentation device and render a swipe panel on a display of the remote device. A first message is received from the remote device in response to an interaction with the swipe panel. A second message is sent to the presentation device in response to receiving the first message. The second message, when executed by the presentation device, is configured to cause the presentation device to perform an action on the presentation web page corresponding to the user interaction with the swipe panel.

A remote interface server computing device including a processor and a memory coupled to the processor which is configured to be capable of executing programmed instructions comprising and stored in the memory to provide a presentation web page to a presentation device and a remote web page to a remote device. The remote web page is configured to, when executed by the remote device, register the remote device as associated with the presentation device and render a swipe panel on a display of the remote device. A first message is received from the remote device in response to an interaction with the swipe panel. A second message is sent to the presentation device in response to receiving the first message. The second message, when executed by the presentation device, is configured to cause the presentation device to perform an action on the presentation web page corresponding to the user interaction with the swipe panel.

A system for facilitating a remote interface includes a remote interface server computing device including a first processor and a first memory coupled to the first processor. The first process is configured to be capable of executing programmed instructions comprising and stored in the first memory to provide a presentation web page to a presentation device and a remote web page to a remote device. The remote web page configured to, when executed by the remote device, register the remote device as associated with the presentation device and render at least a swipe panel on a display of the remote device. The system further includes a WebSocket server computing device including a second processor and a second memory coupled to the second processor. The second processor is configured to be capable of executing programmed instructions comprising and stored in the second memory to receive a first message from the remote device in response to a user interaction with the swipe panel. A second message is sent to the presentation device in response to receiving the first message. The second message, when executed by the presentation device, is configured to cause the presentation device to perform an action on the presentation web page corresponding to the user interaction with the swipe panel.

This technology provides a number of advantages including providing methods, non-transitory computer readable media, devices, and systems that facilitate remote interfaces for presentation devices. With this technology, presentation device (e.g., a kiosk) can be seamlessly controlled by a remote device (e.g., mobile phones) using messages exchanged based on the WebSocket protocol. By leveraging remote devices, this technology allows presentation devices to be less complex and less costly. Additionally, private information can be advantageously submitted without displaying the information in a visible format on the display of a presentation device.

BRIEF DESCRIPTION OF THE DRAWINGS

FIG. 11 is an exemplary remote web page subsequent to user interaction with an edit button;

FIG. 12 is an exemplary remote web page with a virtual keyboard;

DETAILED DESCRIPTION

Figure 1:
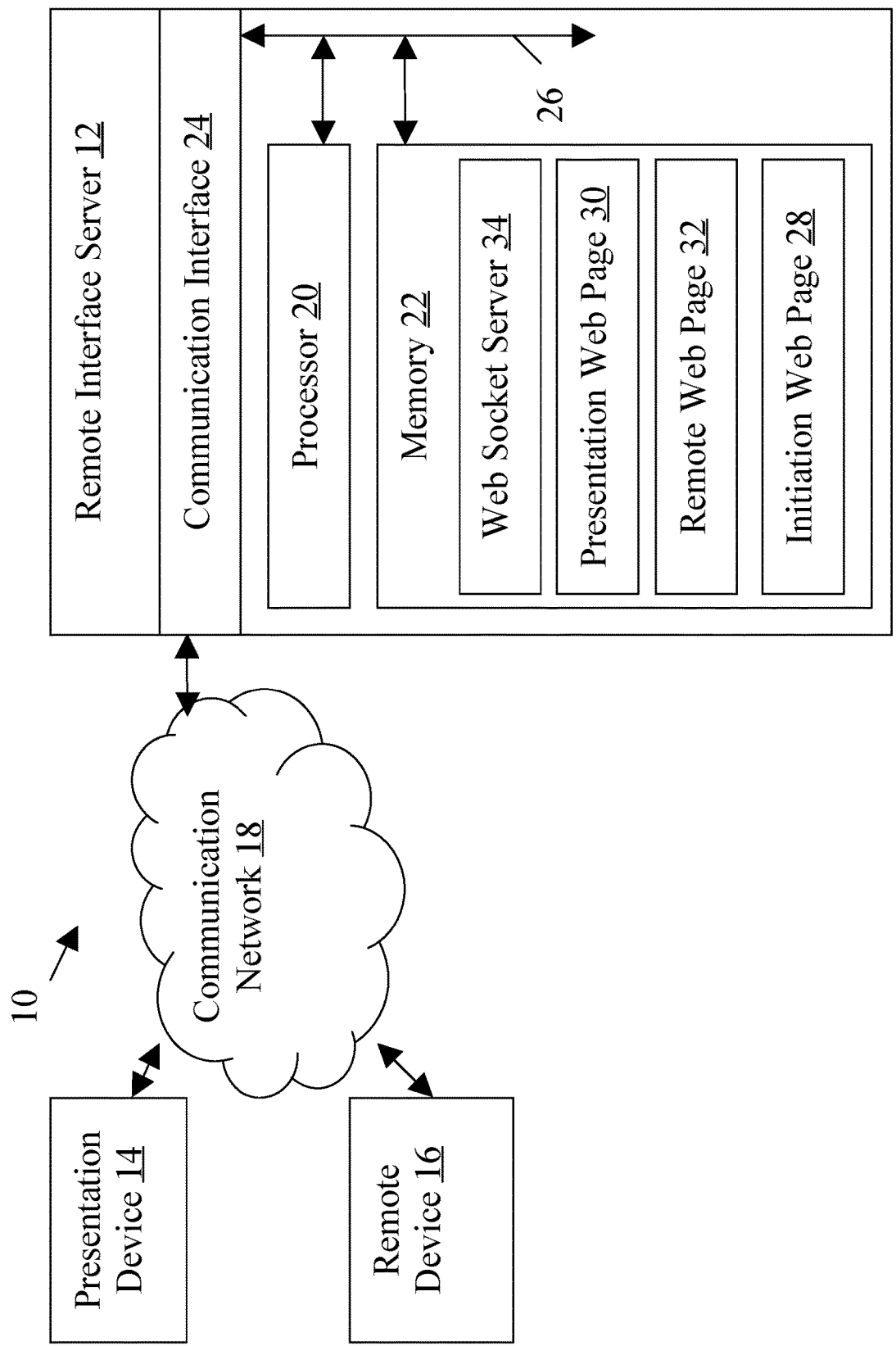
FIG. 1 is a block diagram of a network environment with an exemplary remote interface server coupled to a presentation device and a remote device.

An exemplary network environment 10 with a remote interface server 12 coupled to a presentation device 14 and a remote device 16 is illustrated in FIG. 1. In this example, the remote interface server 12, presentation device 14, and remote device 16 are coupled together by at least one communication network 18, although other numbers and types of systems, devices, and/or elements in other configurations or network topologies can also be used. This technology provides a number of advantages including methods, non-transitory computer readable media, devices, and systems that facilitate a remote interfaces to effectively replicate, on the presentation device 14, user interactions with a web page rendered on the remote device 16 while maintaining information privacy.

The remote interface server 12 may perform any number of functions including hosting and providing web content and facilitating communications between the presentation device 14 and the remote device 16 according to the WebSocket protocol, for example. In this example, the remote interface server 12 includes a processor 20, a memory 22, and a communication interface 24, which are coupled together by a bus 24 or other communication link, although other numbers and types of components, parts, devices, systems, and elements in other configurations and locations can be used.

The remote interface server 12 may perform any number of functions including hosting and providing web content and facilitating communications between the presentation device 14 and the remote device 16 according to the web socket protocol, for example. In this example, the remote interface server 12 includes a processor 20, a memory 22, and a communication interface 24, which are coupled together by a bus 24 or other communication link, although other numbers and types of components, parts, devices, systems, and elements in other configurations and locations can be used.

The processor 20 in the remote interface server 12 executes a program of stored instructions for one or more aspects of this technology, as described and illustrated by way of the embodiments herein, although the processor 20 could execute other numbers and types of programmed instructions. The processor 20 of the remote interface server 12 may include one or more central processing units or general purpose processors with one or more processing cores, for example.

The memory 24 in the remote interface server 12 stores these programmed instructions for one or more aspects of this technology, as described and illustrated herein, although some or all of the programmed instructions could be stored and/or executed elsewhere. Optionally, the memory 24 in this example stores a plurality of web pages including at least one initiation web page 28, presentation web page 30, and remote web page 32, as described and illustrated in more detail later. A variety of different types of memory storage devices, such as a random access memory (RAM), read only memory (ROM), hard disk drive(s), flash, solid state drive (s), or other computer readable medium which is read from and/or written to by a magnetic, optical, or other reading and/or writing system that is coupled to the processor, can be used for the memory 22 in the remote interface server 12.

In this particular example, the memory 24 also includes a web socket WebSocket server 34. The WebSocket server 34 in this example is a software module that includes programmed instructions that, when executed by the processor, generate a web socket WebSocket server configured to facilitate communications between the presentation device 14 and the remote device 16 according to the web socket WebSocket protocol, as described and illustrated in more detail later.

The communication interface 24 in the remote interface server 12 is used to operatively couple and communicate between the remote interface server 12, the presentation device 14, and the remote device 16, which are all coupled together via the communication network 18, although other types and numbers of communication networks or systems with other types and numbers of connections and configurations to other devices and elements can also be used. By way of example only, the communication network 18 can use TCP/IP over Ethernet and industry-standard protocols, including hypertext transfer protocol (HTTP), and/or secure HTTP (HTTPS), although other types and numbers of communication networks, such as a direct connection, modems and phone lines, e-mail, and wireless and hardwire communication technology, each having their own communications protocols, can be used.

The presentation device 14 and the remote device 16 in this particular example enable a user to request, receive, and interact with applications, web services, and content hosted by the remote interface server 12 using the communication network 18, although one or more of the presentation device 14 or remote device 16 could access content and utilize other types and numbers of applications from other sources and could provide a wide variety of other functions for the user.

Each of the presentation device 14 and remote device 16 in this example includes a processor, a memory, an input device, a display device, and a communication interface, which are coupled together by a bus or other communication link, although one or more of presentation device 14 or remote device 16 can include other numbers and types of components, parts, devices, systems, and elements in other configurations. The processor in each of the presentation device 14 and remote device 16 can execute a program of instructions stored in the memory the client device for one or more aspects of this technology, as described and illustrated herein, although the processor could execute other numbers and types of programmed instructions.

The input device in each of the presentation device 14 and remote device 16 can be used to input selections, such as a request for a particular web page or other content stored by the remote interface server 12 or another web content server, although the input device could be used to input other types of requests and data and interact with other elements. The input device can include keypads, touch screens, and/or vocal input processing systems, although other types and numbers of input devices can also be used.

The display device in each of the presentation device 14 and remote device 16 can be used to show data and information to a user, such as web pages and other content retrieved from the remote interface server 12 or another web content server by way of example only. The display device in the presentation device 14 can be a television screen and the display device in the remote device 16 can be a mobile phone screen, for example, although other types and numbers of display devices could be used depending on the particular type of presentation device 14 and remote device 16. The communication interface in each of the presentation device 14 and remote device 16 can be used to operatively couple and communicate between the presentation device 14, remote device 16, and remote interface server 12 over the communication network 18.

By way of example only, the presentation device 14 can be relatively less mobile than the remote device 16 and can include a television, kiosk, or other device with a relatively large display as compared to that of the remote device 16, although other types of presentation devices can also be used. Accordingly, in some examples, the remote device 16 is relatively more mobile than the presentation device 14 and can be a smartphone, personal digital assistant, tablet, netbook, notebook, or other device with a relatively small display as compared to that of the presentation device 14, although other types of remote devices can also be used.

Figure 2:
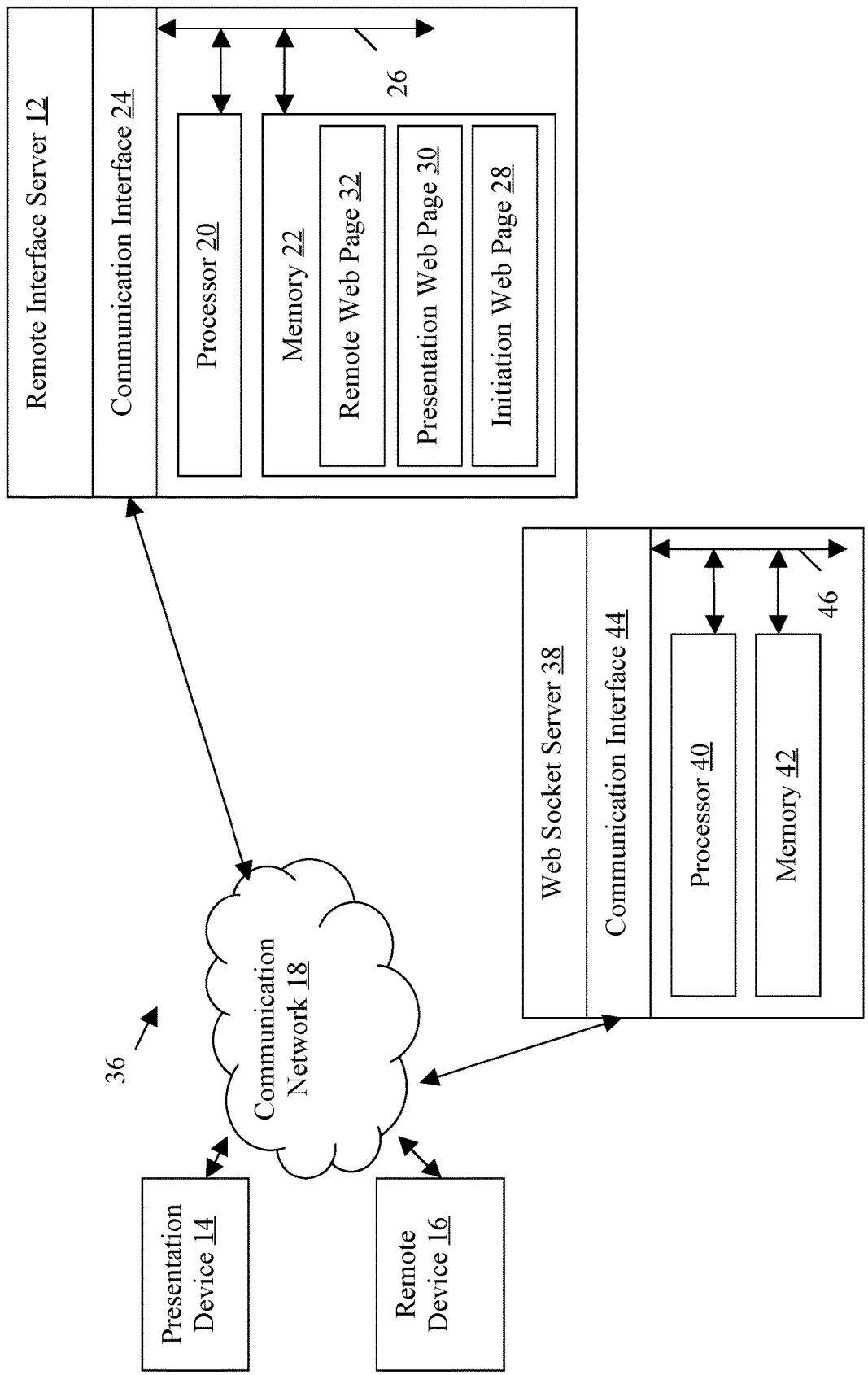
FIG. 2 is a block diagram of another network environment with an exemplary remote interface server coupled to a presentation device, a remote device, and a WebSocket server.

Referring more specifically to FIG. 2 another exemplary network environment 36 with a remote interface server 12 coupled to a presentation device 14, a remote device 16, and a WebSocket server 38 is illustrated. The remote interface server 12, presentation device 14, remote device 16, and communication network 18 in this example are the same as described and illustrated earlier with reference to FIG. 1 except that the remote interface server 12 does not includes the WebSocket server 24. Instead, in this particular example, the WebSocket server 38 is provided as a separate WebSocket server computing device in the environment 36 that is also configured to communicate with the presentation device 14 and the remote device 16 via the communication network 18. Other network topologies and numbers of remote interface servers and/or WebSocket servers can also be provided in network environment 10 or 36.

The WebSocket server 38 in the particular example illustrated in FIG. 2 includes a processor 40, a memory 42, and a communication interface 44, which are coupled together by a bus 46 or other communication link, although other numbers and types of components, parts, devices, systems, and elements in other configurations and locations can be used. The processor 40 in the WebSocket server 38 executes a program of stored instructions one or more aspects of this technology, as described and illustrated by way of the embodiments herein, although the processor 40 could execute other numbers and types of programmed instructions. The processor 40 of the WebSocket server 38 may include one or more central processing units or general purpose processors with one or more processing cores, for example.

The memory 42 in the WebSocket server 38 stores these programmed instructions for one or more aspects of this technology, as described and illustrated herein, although some or all of the programmed instructions could be stored and/or executed elsewhere. A variety of different types of memory storage devices, such as a random access memory (RAM), read only memory (ROM), hard disk drive(s), flash, solid state drive(s), or other computer readable medium which is read from and/or written to by a magnetic, optical, or other reading and/or writing system that is coupled to the processor 40, can be used for the memory 42 in the WebSocket server 38.

The communication interface 44 in the WebSocket server 38 is used to operatively couple and communicate between the WebSocket server 38, the presentation device 14, and the remote device 16, which are all coupled together via the communication network 18, although other types and numbers of communication networks or systems with other types and numbers of connections and configurations to other devices and elements can also be used. By way of example only, the communication network 18 can use TCP/IP over Ethernet and industry-standard protocols, including hypertext transfer protocol (HTTP) and the WebSocket protocol, although other types and numbers of communication networks, such as a direct connection, modems and phone lines, e-mail, and wireless and hardwire communication technology, each having their own communications protocols, can also be used.

The embodiments of the remote interface server 12, WebSocket server 38, presentation device 14, and remote device 16 are described and illustrated herein for exemplary purposes and many variations of the specific hardware and software used to implement the embodiments are possible, as will be appreciated by those skilled in the relevant art(s). Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable media having instructions stored thereon for one or more aspects of this technology as described and illustrated by way of the embodiments herein, as described herein, which when executed by a processor, cause the processor to carry out the steps necessary to implement the methods of the embodiments, as described and illustrated herein.

Figure 3:
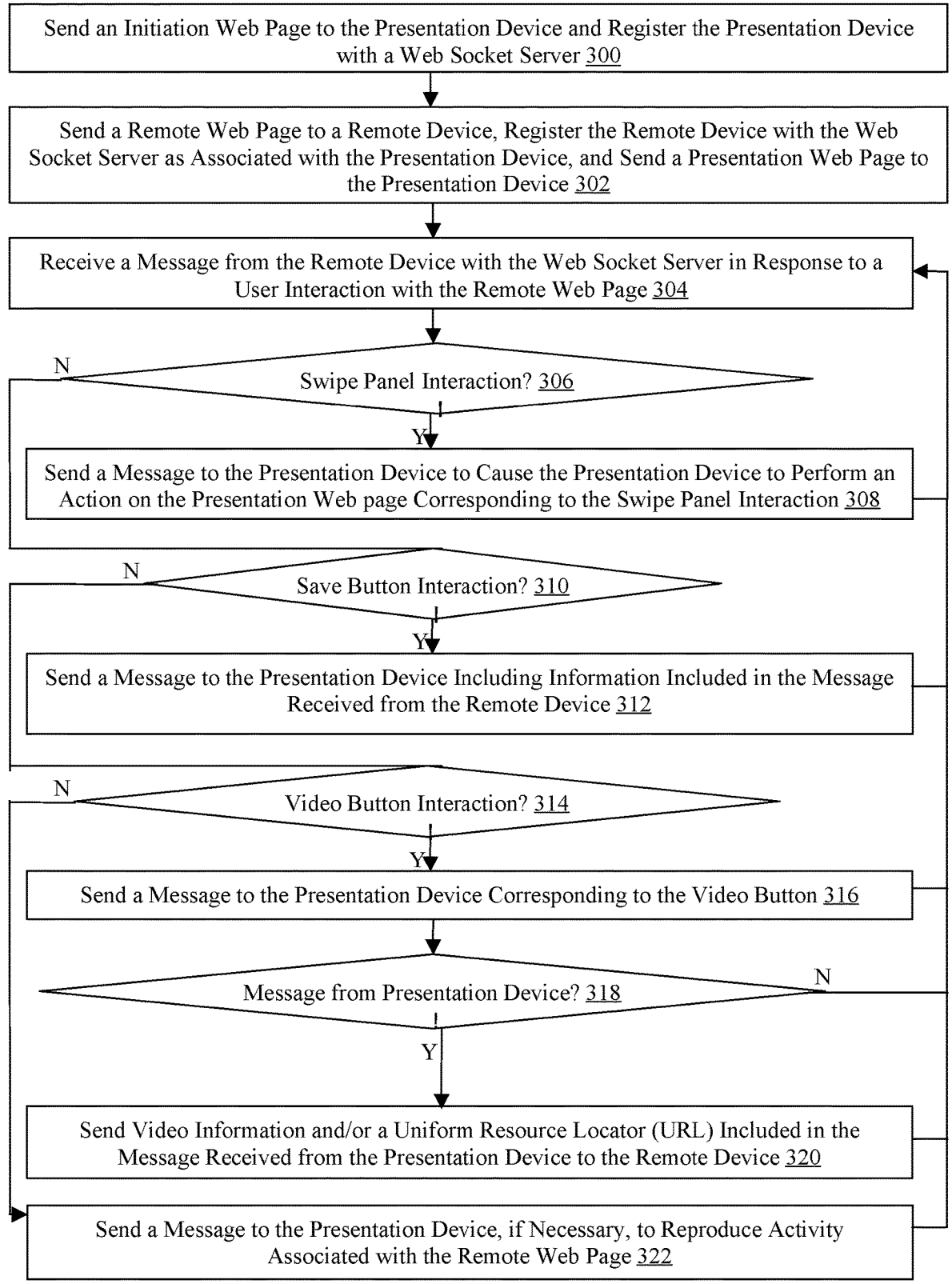
FIG. 3 is a flowchart of an exemplary method for facilitating a remote interface.

An exemplary method for facilitating a remote interface will now be described with reference to FIGS. 1-15. Referring more specifically to FIG. 3, in step 300 in this example, the remote interface server 12 sends the initiation web page 28 to the presentation device 14 and registers the presentation device 14 with the WebSocket server 34 or 38. The remote interface server 12 can send the initiation web page 28 in response to a request for the initiation web page 28 received from the presentation device 14. In one example, the presentation device 14 is a smart television executing a web browser which facilitates the retrieval of the initiation web page 28 at the request of a user, although other types of presentation devices and other methods of providing the initiation web page 28 can also be used. Upon receipt of the initiation web page 28, the presentation device 14 executes JavaScript code included with the initiation web page 28, which is configured to communicate with the remote interface server 12 to register the presentation device 12 by establishing a connection between the presentation device and the WebSocket server 34 or 38.

In step 302, the remote interface server 12 sends a remote web page 32 to the remote device 16, registers the remote device 16 with the WebSocket server 34 or 38 as associated with the presentation device 14, and sends a presentation web page 30 to the presentation device 14. The remote web page 32 and presentation web page 30 can be sent by the remote interface server 12 in response to a request from the remote device 16 initiated based on an interaction by the remote device 16 with at least a portion of the initiation web page 28 rendered on the display of the presentation device 14.

Figure 4:
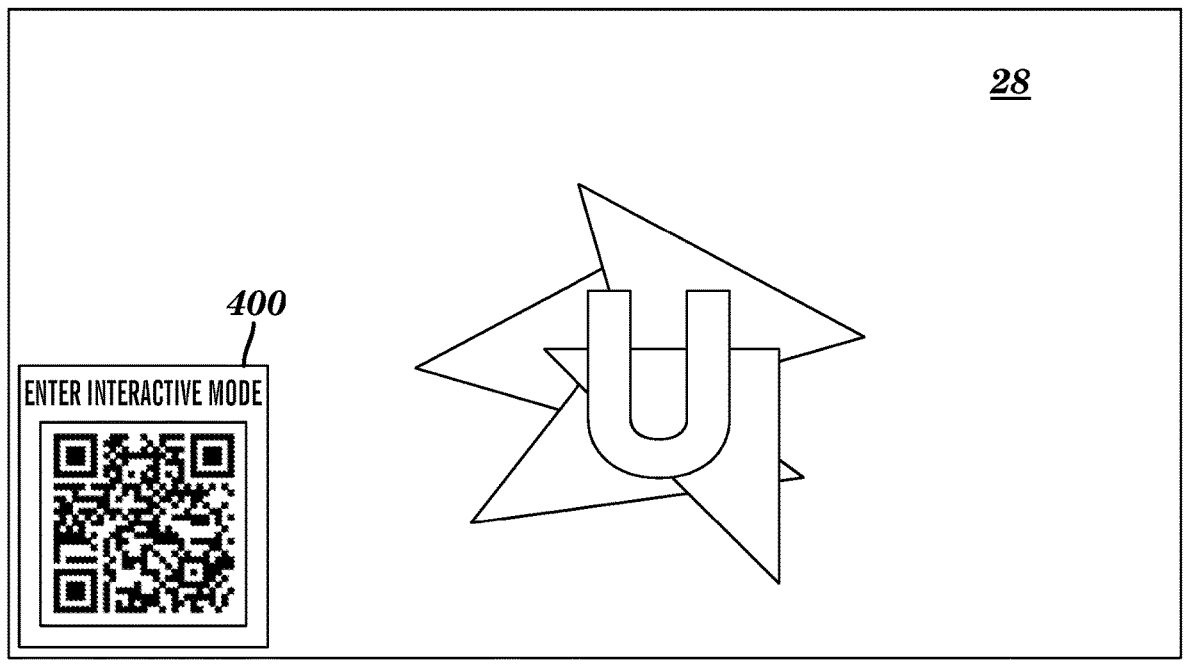
FIG. 4 is an exemplary initiation web page.

Referring more specifically to FIG. 4, an exemplary initiation web page 28 is illustrated. In this example, the initiation web page 28 includes a portion with an interactive mode interface 400, which is a three dimensional bar code in this example, although other types of interactive mode interfaces and portions of the initiation web page 28 can also be used.

Accordingly, a user of the remote device 16 in this example can scan the interactive mode interface 400 which encodes at least a Uniform Resource Locator (URL) and causes a web browser executed by the remote device 16 to request the remote web page 32 located at the URL from the remote interface server 12, which sends the remote web page 32 to the remote device 16 in response. In this example, the remote web page 32 is configured to, when executed by the web browser of the remote device 16, register the remote device 16 with the WebSocket server 34 or 38 as associated with the presentation device 14.

Accordingly, the remote web page 32 can include JavaScript code executed by the remote device 16 that facilitates communication by the remote device 16 with the WebSocket server 34 or 38 to establish a connection between the remote device 16 and the WebSocket server 34 or 38, as well as an association with the presentation device 14. Optionally, the interactive mode interface 400 of the initiation web page 28 can further encode an identifier of the presentation device 14 which can be used to facilitate the association of the presentation device 14 and the remote device 16 with the WebSocket server 34 or 38. Other methods of initiating the association of the presentation device 14 and the remote device 16 with the WebSocket server 34 or 38 can also be used.

In response to receipt of the request from the remote device 16 for the remote web page 32, or in response to a subsequent communication to the remote interface server 12 by the remote device 16 executing the JavaScript code of the remote web page 32, the remote interface server 12 also sends the presentation web page 30 to the presentation device 14. The remote web page 32 and presentation web page 30 can be different versions of a same web page such that the remote web page 32 includes at least a portion of the content of the presentation web page 30, although other types of presentation and remote web pages can also be used.

Figure 5:
FIG. 5 is an exemplary presentation web page.
Figure 6:
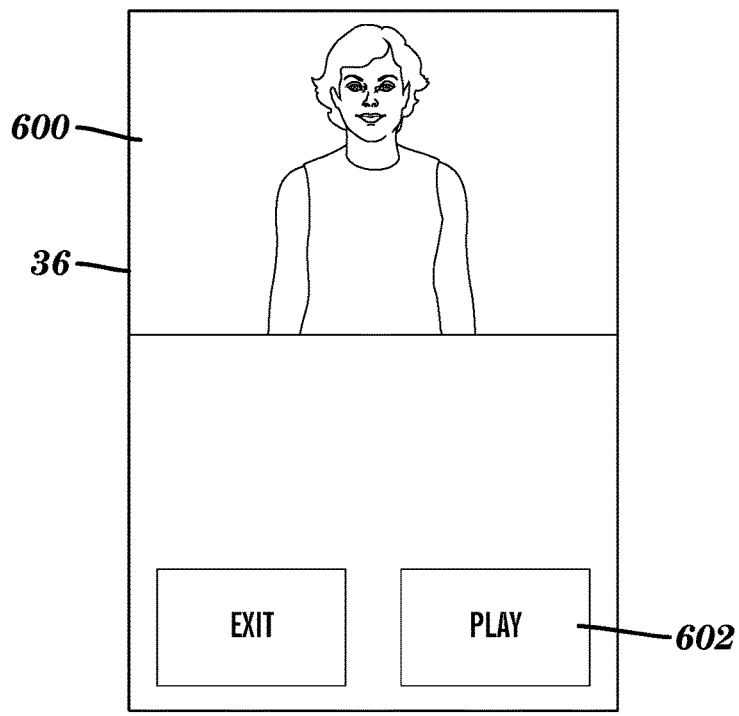
FIG. 6 is an exemplary remote web page.

Referring more specifically to FIG. 5, an exemplary presentation web page 30 is illustrated and referring more specifically to FIG. 6, an exemplary remote web page 32 is illustrated. In this example, the presentation web page 30 and remote web page 32 are different versions of the same web page as the presentation web page includes multiple panels that can be manipulated, as described and illustrated in more detail later, whereas the remote web page 32 is a mobile version of the web page which includes content of only one of the panels included in the presentation web page 30. The remote web page 32 is also configured to, when executed by the remote device 16, render a swipe panel 600, and optionally one or more buttons, on the display of the remote device 16. In this example, the swipe panel 600 includes the content of the panel corresponding to one of the panels of the presentation web page 30, although the swipe panel 600 can be located elsewhere in the web page and/or display of the remote device 16.

Referring back to FIG. 3, in step 304 the WebSocket server 34 or 38 receives a message from the remote device 16 in response to a user interaction with the remote web page 32. The message can comply with the WebSocket protocol and can be received by the WebSocket server 34 or 38 using the connection established with the remote device 16. Accordingly, the JavaScript code of the remote web page 32 executed by the remote device 16 can determine when a user has interacted with the remote web page 32 and send a message to the WebSocket server 34 or 38 corresponding to the interaction in response. The message can include information regarding the type of interaction and any other contextual information, for example.

In step 306, the WebSocket server 34 or 38 determines whether the user interaction corresponding to the message received in step 304 is a swipe panel interaction, and optionally whether the interaction was a horizontal or vertical swipe gesture, for example. If the WebSocket server 34 or 38 determines that the user interaction is a swipe panel interaction, then the Yes branch is taken to step 308. In step 308, the WebSocket server 34 or 38 sends a message to the presentation device 14 to cause the presentation device 14 to perform an action on the presentation web page 30 corresponding to the swipe panel interaction.

Figure 7:
FIG. 7 is an exemplary presentation web page.

Referring more specifically to FIG. 7, a presentation web page 30 subsequent to performing an action corresponding to a horizontal swipe gesture with the swipe panel 600 of the remote web page 32 is illustrated. In this example, the panel with a video illustrated in the foreground in FIG. 5 has been rotated to the left, such as by three dimensional rotation, for example, resulting in the modified presentation web page 30 illustrated in FIG. 7 in which a new panel has been rotated to the foreground.

Figure 8:
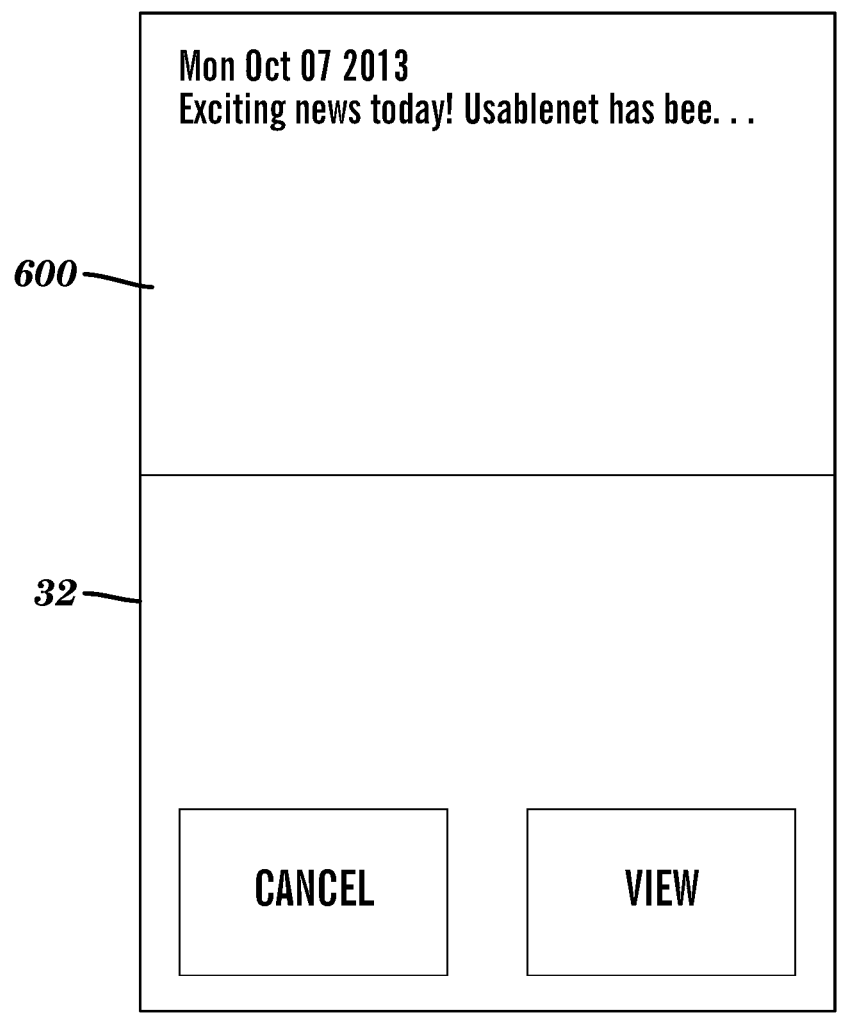
FIG. 8 is an exemplary remote web page modified according to a horizontal swipe gesture with a swipe panel.

Referring more specifically to FIG. 8, a remote web page 32 modified according to a horizontal swipe gesture with the swipe panel 600 of the remote web page 32 is illustrated. In this example, the panel with the video illustrated in the swipe panel 600 in FIG. 6 has been moved off screen, such as by two dimensional slide animation, for example, resulting in the modified remote web page 32 illustrated in FIG. 8 in which a new panel with different content has replaced the previous panel in the swipe panel 600.

In other examples, the user interaction can be a vertical swipe gesture and the action can be a vertical scroll. For example, a user can perform a vertical swipe gesture on the swipe panel 600 of the remote web page illustrated in FIG.

8 resulting in a vertical scroll action on the presentation web page 30 illustrated in FIG. 7. Other exemplary gestures and interactions with the swipe panel 600 and corresponding actions, as well as animations and rotations can also be used. Accordingly, in this example, a user of the remote device 16 can contemporaneously control the display of the presentation device 14, and in particular the presentation web page 30, without physically interacting with the presentation device 14 and using only the interface provided on the remote device 16 through the remote web page 32.

Referring back to FIG. 3, if the WebSocket server 34 or 38 determines that the user interaction is not a swipe panel interaction in step 306, then the No branch is taken to step 310. In step 310, the WebSocket server 34 or 38 determines whether the user interaction corresponding to the message received in step 304 is a save button interaction. If the WebSocket server 34 or 38 determines that the user interaction is a save button interaction, then the Yes branch is taken to step 312.

Figure 9:
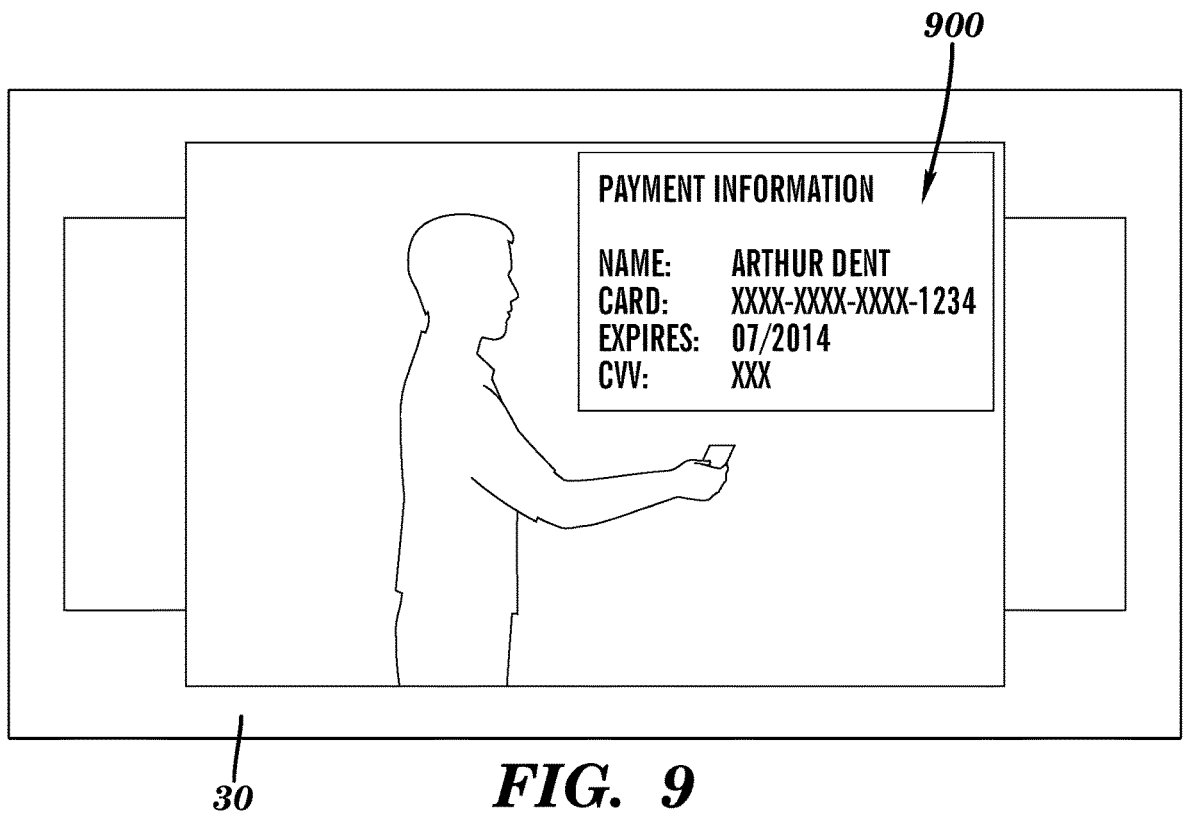
FIG. 9 is an exemplary presentation web page with input fields.

Optionally, the buttons of the remote web page 32 as rendered on the display of the remote device 16 can change based on functionality present in the remote web page 32 and/or presentation web page 30. For example, referring back to FIG. 6, the remote web page 32 includes play button 602 corresponding to the video content rendered in the swipe panel 600. Referring more specifically to FIG. 9, a presentation web page 30 with input fields 900 is illustrated and referring more specifically to FIG. 10, a remote web page 32 with the input fields 1000 is illustrated. In this example, the buttons are modified by the JavaScript code of the remote web page 32 to include an edit button 1002 corresponding to the content of the input fields 1000 of the remote web page 32.

Figure 10:
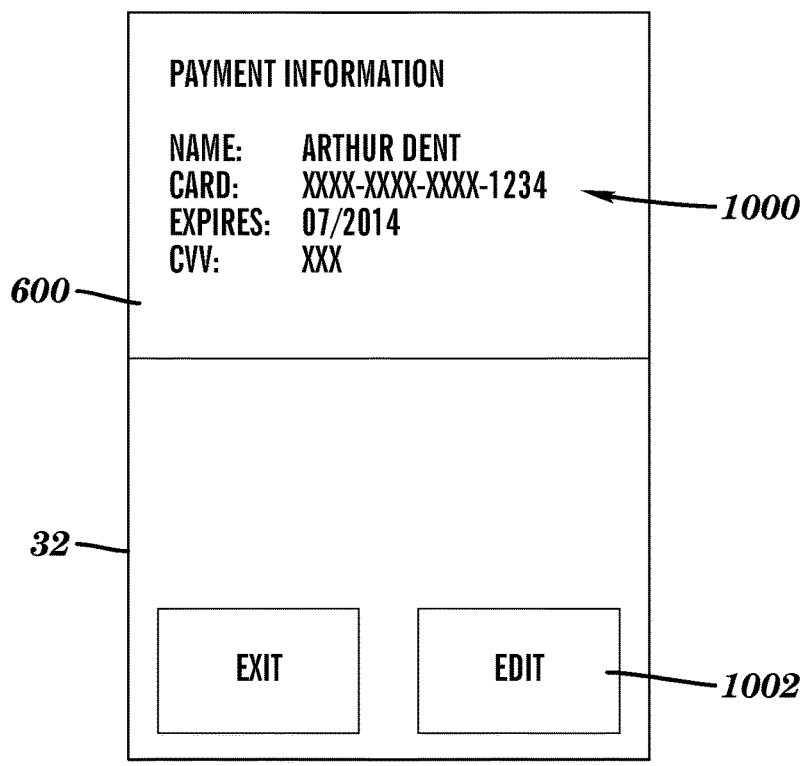
FIG. 10 is an exemplary remote web page with input fields.

Referring more specifically to FIG. 11, the remote web page 32 of FIG. 10 is illustrated subsequent to user interaction with the edit button 1002. Upon user interaction with the edit button 1002, the remote web page 32 is configured to render a save button 1100 in place of the edit button 1002 as well as editable input fields 1000 corresponding to the input fields 900 of the presentation web page 30 of FIG. 9. In this example, private information such as a credit card number is optionally obfuscated in the presentation web page 30 since the presentation web page 30 is rendered on a presentation device 14 which may have a relatively large display and/or may be visible to the environment or other members of the public. However, the editable input fields 1000 rendered by the remote web page 32 in response to the user interaction with the edit button 1002 are rendered without the obfuscation to allow user editing.

Referring more specifically to FIG. 12, optionally, the remote device 16 is configured to display a virtual keyboard 1200 upon user selection of one of the editable input fields 1000 allowing the user to edit the information. In this example, the user has edited the name, credit card number, and CVV fields. Upon entering the new information, the user can select the save button 1100 as illustrated in FIG. 11. In response to user selection of the save button 1100, the message received by the WebSocket server 34 or 38 in step 304 of FIG. 3 is sent by the remote device 16 and includes at least any information updated by the user.

Figure 13:
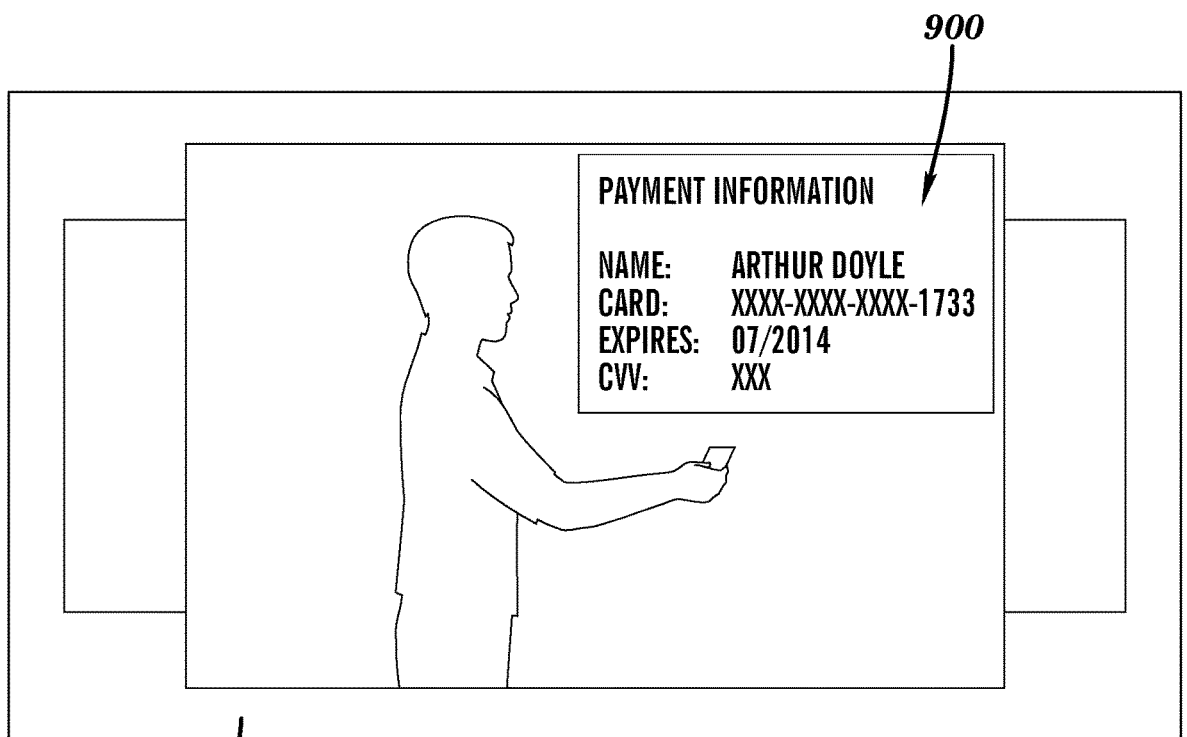
FIG. 13 is an exemplary presentation web page with input fields subsequent to a user editing content.

In step 312, the WebSocket server 34 or 38 sends a message to the presentation device 14 including information included in the message received from the remote device 16 in step 304. Referring more specifically to FIG. 13, the presentation web page 30 with input fields 900 subsequent to user editing of the content is illustrated. In this example, any private information continues to be rendered in an obfuscated manner in the presentation web page 30 rendered on the display of the presentation device 14.

Referring back to FIG. 3, if the WebSocket server 34 or 38 determines in step 310 that the user interaction is not a save button interaction, then the No branch is taken to step 314. In step 314, the WebSocket server 34 or 38 determines whether the user interaction corresponding to the message received in step 304 is a video button interaction. If the WebSocket server 34 or 38 determines that the user interaction is a video button interaction, then the Yes branch is taken to step 316.

Figure 14:
FIG. 14 is an exemplary presentation web page subsequent to user interaction with a play video button of a remote web page.

In step 316, the WebSocket server 34 or 38 sends a message to the presentation device 14 corresponding to the video button interacted with by the user of the remote device 16. Referring back to FIG. 6, user interaction with the play button 602, for example, can cause a message to be sent to the WebSocket server 34 or 38 which, in step 316 of FIG. 3, sends a message to the presentation device 16 to initiate the video of the presentation web page 30 in response. Referring more specifically to FIG. 14, the presentation web page 30 subsequent to user interaction with the play button 602 of the remote web page 32 is illustrated.

Figure 15:
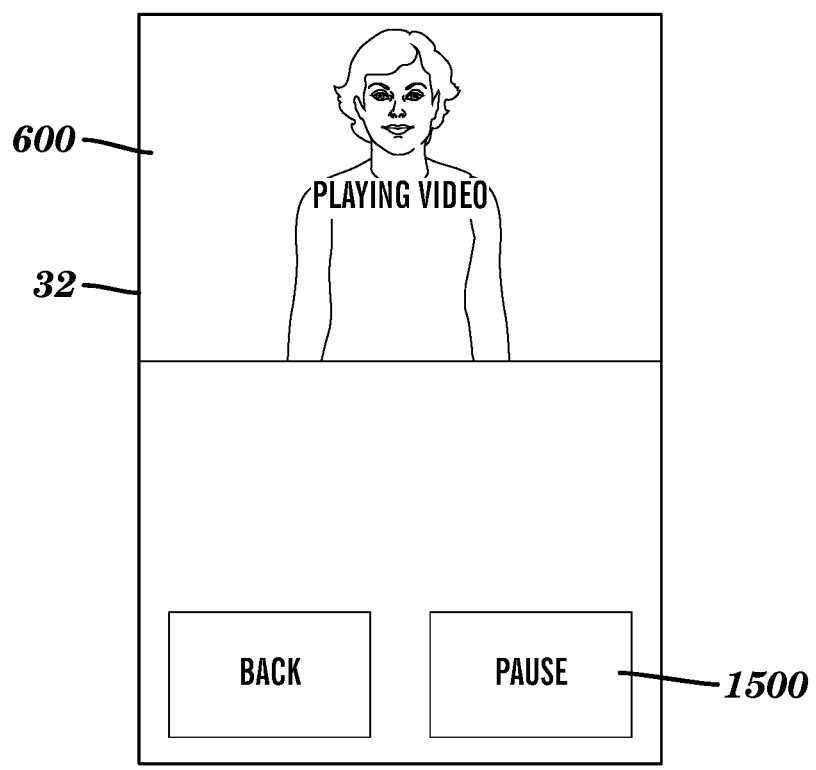
FIG. 15 is an exemplary remote web page subsequent to user interaction with a play video button of the remote web page.

In FIG. 15, the remote web page 32 subsequent to user interaction with the play button 602 of the remote web page 32 is illustrated. Optionally, in this example, the remote web page 32 is configured to convert the swipe panel 600 to indicate that the video is playing and to render a pause button 1500 in place of the play button 602, although the remote web page 32 can be configured to provide other functionality in response to the user interaction with the play button 602. In another example, user interaction with the pause button 1500 of the remote web page 32 can be determined in step 316, which can cause a message to be sent to the presentation device 14 to pause the video of the presentation web page 30 in response. In yet other examples, a stop button can be rendered on the remote web page 32 and any other type of button can also be used.

Referring back to FIG. 3, in step 318, the WebSocket server 34 or 38 optionally determines whether a message is received from the presentation device 14 in response to the message sent to the presentation device 14 in step 316 in examples in which the video button interaction is a user interaction with a play button 602. Optionally, one or more callbacks can be received by the WebSocket server 34 or 38 from the presentation device 14 after any of the messages sent in the after any of steps 308, 312, or 316. However, in this example, the message received from the presentation device 14 in step 318 optionally includes video information (e.g., elapsed time) and/or a URL. The URL can correspond with content displayed in the video. For example, if the video is of a model on a runway at a fashion show, the URL can point to content including information regarding an article of the clothing worn by the model including associated cost and purchase information.

Accordingly, if the web WebSocket 34 or 38 determines that a message is received from the presentation device 14 in step 318, then the Yes branch is taken to step 320. In step 320, the WebSocket server 34 or 38 sends a message to the remote device 16 in response to the message received from the presentation device 14 in step 316. The message sent by the WebSocket server 34 or 38 in step 320 can include the video information and/or the URL included in the message received from the presentation device 14 in step 318. In response, the remote web page 32 can be configured to render the video information and/or content located at the URL on the display of the remote device 16, such as on the swipe panel 600 for example.

Referring back to step 318, if the WebSocket server determines a message is not received from the presentation device 14, then the No branch is taken back to step 304 and the WebSocket server 34 or 38 receives another message from the remote device 16 in response to a subsequent user interaction with the remote web page 32. Referring back to step 314, if the WebSocket server 34 or 38 determines that the user interaction is not a video button interaction, then the No branch is taken to step 322. In step 322, the WebSocket server 34 or 38 sends a message to the presentation device 14, if necessary, to reproduce activity associated with the remote web page 32.

Accordingly, while the swipe panel, save button, and video button user interactions have been described and illustrated earlier by way of example only, other interactions with the remote web page 32 are possible. In response to the user interactions, the remote web page 32 is configured to send a message to the WebSocket server 34 or 38, if necessary, which is configured to identify the associated presentation device 14 and send a corresponding message to the presentation device 14 to modify the presentation web page 30 accordingly. Thereby, a user of the remote device 16 interacting with the remote web page 32 can effectively control the presentation web page 30 rendered on the display of the presentation device 14.

Accordingly, with this technology, presentation devices can be seamlessly controlled by remote devices using messages exchanged based on the WebSocket protocol. As the remote devices are used to facilitate an interface, using specially programmed web pages and without any dedicated hardware or software, the presentation devices can be less complex and less costly and do not require multi-touch displays or any other physical interfaces. Additionally, private information can be advantageously submitted, such as with respect to facilitating product purchases, without displaying the information in a visible format on the display of the presentation device, which is visible publicly in many environments.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating a remote interface implemented by one or more remote interface server computing devices, the method comprising:
providing a presentation web page to a presentation device and a remote web page to a remote device, wherein the remote web page is configured to, when executed:
send an identifier for the presentation device included with the remote web page to a WebSocket server to register the remote device with the WebSocket server as associated with the presentation device, wherein the remote device is registered without exchanging any content of the remote web page with the presentation device;
render at least a swipe panel of the remote web page on a touch screen display of the remote device, wherein the swipe panel comprises graphical content simultaneously displayed on one or more portions of the presentation web page previously provided to the presentation device and is configured to receive a swipe gesture directly, without interaction with an input device separate from the touch screen display, and based on physical contact by a user at a location of the graphical content in the swipe panel; and
transition the swipe panel to another swipe panel of the remote web page with additional graphical content in response to the swipe gesture;
receiving a first message from the remote device in response to a received indication of the swipe gesture, wherein the remote web page is further configured to, when executed, establish a first connection with the WebSocket server and the first message is received via the first connection according to a WebSocket protocol; and
sending a second message to the presentation device in response to receiving the first message, wherein the second message is configured to cause the presentation device to perform an action with respect to the one or more portions of the presentation web page comprising the graphical content, the action corresponding to the swipe gesture.

2. The method of claim 1, further comprising providing an initiation web page to the presentation device, the initiation web page configured to register the presentation device and to establish a second connection with the WebSocket server, wherein the presentation and remote web pages are provided to the presentation and remote devices, respectively, in response to a received indication of an interaction at the remote device with at least a portion of the initiation web page.

3. The method of claim 1, wherein the:
swipe panel is further configured to receive the swipe gesture without prior selection of an icon associated with a tool that facilitates the swipe gesture; and
second message is configured to cause the presentation device to execute the transition on the presentation web page previously provided to the presentation device.

4. The method of claim 1, wherein:
the presentation web page further comprises a first input field with obfuscated sensitive information; and
the remote web page is further configured to, when executed, render an editable second input field that includes the sensitive information of the first input field visible on the touch screen display of the remote device.

5. The method of claim 1, wherein the remote web page is further configured to, when executed, render a play button on the touch screen display of the remote device, the presentation web page and the remote web page comprise a video, the remote web page is further configured to, when executed and in response to receiving a user selection of the play button, modify the swipe panel to display information retrieved using a uniform resource locator (URL), and the method further comprises:
receiving a third message from the remote device in response to a user selection of the play button;

sending a fourth message to the presentation device in response to the third message, the fourth message indicating to the presentation device that the video has been initiated;
receiving a fifth message from the presentation device, the fifth message including the URL; and
sending a sixth message to the remote device in response to the fifth message, the sixth message including the URL.

6. A remote interface server computing device, comprising a memory comprising programmed instructions stored thereon, the memory coupled to a processor which is configured to execute the stored programmed instructions to:
provide a presentation web page to a presentation device and a remote web page to a remote device, wherein the remote web page is configured to, when executed:
send an identifier for the presentation device included with the remote web page to a WebSocket server to register the remote device with the WebSocket server as associated with the presentation device, wherein the remote device is registered without exchanging any content of the remote web page with the presentation device;
render at least a swipe panel of the remote web page on a touch screen display of the remote device, wherein the swipe panel comprises graphical content simultaneously displayed on one or more portions of the presentation web page previously provided to the presentation device and is configured to receive a swipe gesture directly, without interaction with an input device separate from the touch screen display, and based on physical contact by a user at a location of the graphical content in the swipe panel; and
transition the swipe panel to another swipe panel of the remote web page with additional graphical content in response to the swipe gesture;
receive a first message from the remote device in response to a received indication of the swipe gesture, wherein the remote web page is further configured to, when executed, establish a first connection with the WebSocket server and the first message is received via the first connection according to a WebSocket protocol; and
send a second message to the presentation device in response to receiving the first message, wherein the second message is configured to cause the presentation device to perform an action with respect to the one or more portions of the presentation web page comprising the graphical content, the action corresponding to the swipe gesture.

7. The remote interface server computing device of claim 6, wherein the processor is further configured to execute the stored programmed instruction to provide an initiation web page to the presentation device, the initiation web page configured to register the presentation device and to establish a second connection with the WebSocket server, wherein the presentation and remote web pages are provided to the presentation and remote devices, respectively, in response to a received indication of an interaction at the remote device with at least a portion of the initiation web page.

8. The remote interface server computing device of claim 6, wherein:
swipe panel is further configured to receive the swipe gesture without prior selection of an icon associated with a tool that facilitates the swipe gesture; and
second message is configured to cause the presentation device to execute the transition on the presentation web page previously provided to the presentation device.

9. The remote interface server computing device of claim 6, wherein:
the presentation web page further comprises a first input field with obfuscated sensitive information; and
the remote web page is further configured to, when executed, render an editable second input field that includes the sensitive information of the first input field visible on the touch screen display of the remote device.

10. The remote interface server computing device of claim 6, wherein the remote web page is further configured to, when executed, render a play button on the touch screen display of the remote device, the presentation web page and the remote web page comprise a video, the remote web page is further configured to, when executed and in response to receiving a user selection of the play button, modify the swipe panel to display information retrieved using a uniform resource locator (URL), and the processor is further configured to execute the stored programmed instructions to:
receive a third message from the remote device in response to a user selection of the play button;
send a fourth message to the presentation device in response to the third message, the fourth message indicating to the presentation device that the video has been initiated;
receive a fifth message from the presentation device, the fifth message including the URL; and
send a sixth message to the remote device in response to the fifth message, the sixth message including the URL.

11. A non-transitory computer readable medium having stored thereon instructions for facilitating a remote interface comprising executable code which when executed by a processor, causes the processor to:
provide a presentation web page to a presentation device and a remote web page to a remote device, wherein the remote web page is configured to, when executed:
send an identifier for the presentation device included with the remote web page to a WebSocket server to register the remote device with the WebSocket server as associated with the presentation device, wherein the remote device is registered without exchanging any content of the remote web page with the presentation device;
render at least a swipe panel of the remote web page on a touch screen display of the remote device, wherein the swipe panel comprises graphical content simultaneously displayed on one or more portions of the presentation web page previously provided to the presentation device and is configured to receive a swipe gesture directly, without interaction with an input device separate from the touch screen display, and based on physical contact by a user at a location of the graphical content in the swipe panel; and
transition the swipe panel to another swipe panel of the remote web page with additional graphical content in response to the swipe gesture;
receive a first message from the remote device in response to a received indication of the swipe gesture, wherein the remote web page is further configured to, when executed, establish a first connection with the WebSocket server and the first message is received via the first connection according to a WebSocket protocol; and send a second message to the presentation device in response to receiving the first message, wherein the second message is configured to cause the presentation device to perform an action with respect to the one or more portions of the presentation web page comprising the graphical content, the action corresponding to the swipe gesture.

12. The non-transitory computer readable medium of claim 11, wherein the executable code when executed by the processor further causes the processor to provide an initiation web page to the presentation device, the initiation web page configured to register the presentation device and to establish a second connection with the WebSocket server, wherein the presentation and remote web pages are provided to the presentation and remote devices, respectively, in response to a received indication of an interaction at the remote device with at least a portion of the initiation web page.

13. The non-transitory computer readable medium of claim 11, wherein the:
swipe panel is further configured to receive the swipe gesture without prior selection of an icon associated with a tool that facilitates the swipe gesture; and
second message is configured to cause the presentation device to execute the transition on the presentation web page previously provided to the presentation device.

14. The non-transitory computer readable medium of claim 11, wherein:
the presentation web page further comprises a first input field with obfuscated sensitive information; and
the remote web page is further configured to, when executed, render an editable second input field that includes the sensitive information of the first input field visible on the touch screen display of the remote device.

15. The non-transitory computer readable medium of claim 11, wherein the remote web page is further configured to, when executed, render a play button on the touch screen display of the remote device, the presentation web page and the remote web page comprise a video, the remote web page is further configured to, when executed and in response to receiving a user selection of the play button, modify the swipe panel to display information retrieved using a uniform resource locator (URL), and the executable code when executed by the processor further causes the processor to:
receive a third message from the remote device in response to a user selection of the play button;
send a fourth message to the presentation device in response to the third message, the fourth message indicating to the presentation device that the video has been initiated;
receive a fifth message from the presentation device, the fifth message including the URL; and
send a sixth message to the remote device in response to the fifth message, the sixth message including the URL.

16. A system for facilitating a remote interface, the system comprising:
a remote interface server computing device comprising a first memory comprising programmed instructions stored therein and a WebSocket server computing device comprising a second memory comprising additional programmed instructions stored therein, wherein the first memory is coupled to a first processor which is configured to execute the stored programmed instructions to:
provide a presentation web page to a presentation device and a remote web page to a remote device, wherein the remote web page is configured to, when executed:
send an identifier for the presentation device included with the remote web page to the WebSocket server to register the remote device with the WebSocket server as associated with the presentation device, wherein the remote device is registered without exchanging any content of the remote web page with the presentation device;
render at least a swipe panel of the remote web page on a touch screen display of the remote device, wherein the swipe panel comprises graphical content simultaneously displayed on one or more portions of the presentation web page previously provided to the presentation device and is configured to receive a swipe gesture directly, without interaction with an input device separate from the touch screen display, and based on physical contact by a user at a location of the graphical content in the swipe panel; and
transition the swipe panel to another swipe panel of the remote web page with additional graphical content in response to the swipe gesture;
wherein the second memory is coupled to a second processor which is configured to execute the stored additional programmed instructions to:
receive a first message from the remote device in response to the swipe gesture, wherein the remote web page is further configured to, when executed, establish a first connection with the WebSocket server and the first message is received via the first connection according to a WebSocket protocol; and
send a second message to the presentation device in response to receiving the first message, wherein the second message is configured to cause the presentation device to perform an action with respect to the one or more portions of the presentation web page comprising the graphical content, the action corresponding to the swipe gesture.

17. The system of claim 16, wherein the first processor is further configured to execute the stored programmed instructions to provide an initiation web page to the presentation device, the initiation web page configured to register the presentation device and to establish a second connection with the WebSocket server computing device, wherein the presentation and remote web pages are provided to the presentation and remote devices, respectively, in response to a received indication of an interaction at the remote device with at least a portion of the initiation web page.

18. The system of claim 16, wherein the:
swipe panel is further configured to receive the swipe gesture without prior selection of an icon associated with a tool that facilitates the swipe gesture; and
second message is configured to cause the presentation device to execute the transition on the presentation web page previously provided to the presentation device.

19. The system of claim 16, wherein:
the presentation web page further comprises a first input field with obfuscated sensitive information; and
the remote web page is further configured to, when executed render an editable second input field that includes the sensitive information of the first input field visible on the touch screen display of the remote device.

20. The system of claim 16, wherein the remote web page is further configured to, when executed, render a play button on the touch screen display of the remote device, the presentation web page and the remote web page comprise a video, the remote web page is further configured to, when executed and in response to receiving a user selection of the play button, modify the swipe panel to display information retrieved using a uniform resource locator (URL), and the second processor is further configured to execute the stored programmed instructions to:
    receive a third message from the remote device in response to a user selection of the play button;
    send a fourth message to the presentation device in response to the third message, the fourth message indicating to the presentation device that the video has been initiated;
    receive a fifth message from the presentation device, the fifth message including the URL; and
    send a sixth message to the remote device in response to the fifth message, the sixth message including the URL.

\* \* \* \* \*